March 2, 1965  G. M. BUEHRIG  3,171,691
SEAT CONSTRUCTION
Filed July 17, 1963  2 Sheets-Sheet 1
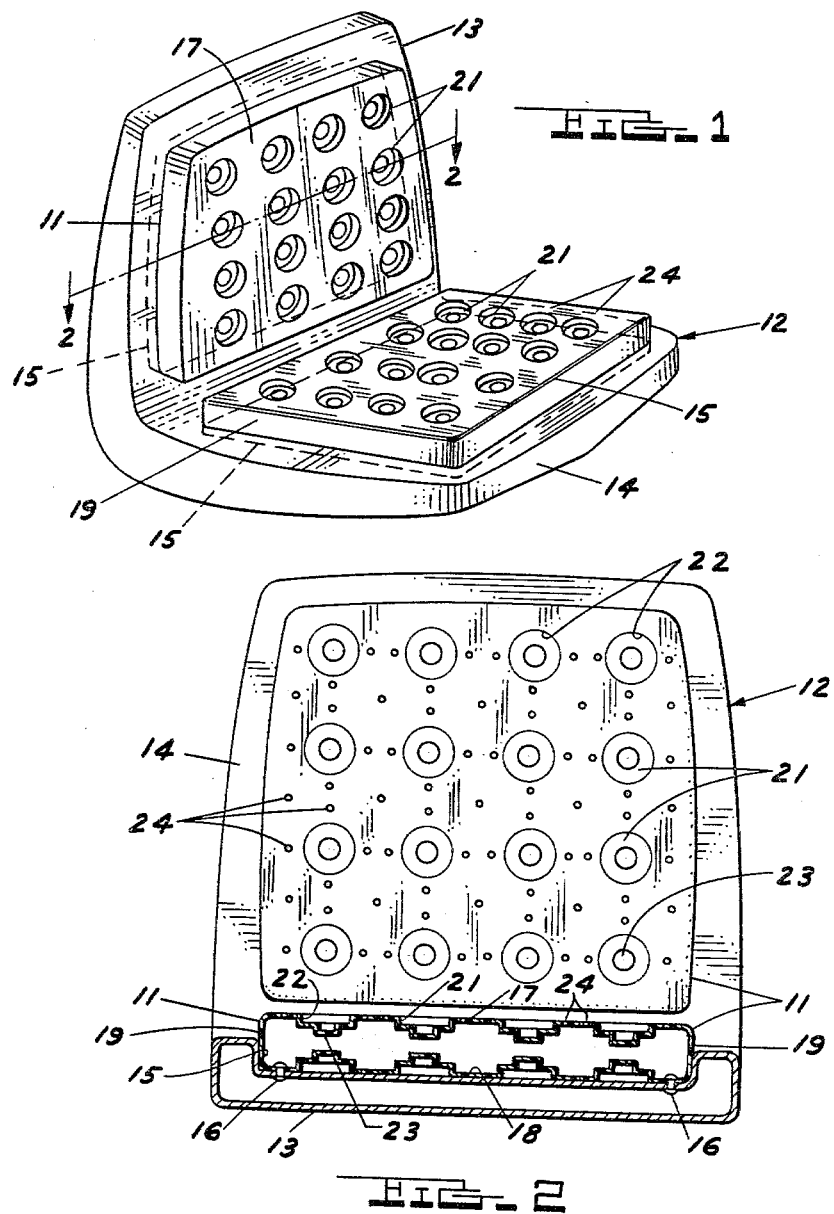
GORDON M. BUEHRIG
INVENTOR.
BY John R. Faulkner
Jerry H. Beck
ATTORNEYS March 2, 1965  G. M. BUEHRIG  3,171,691
SEAT CONSTRUCTION
Filed July 17, 1963  2 Sheets-Sheet 2
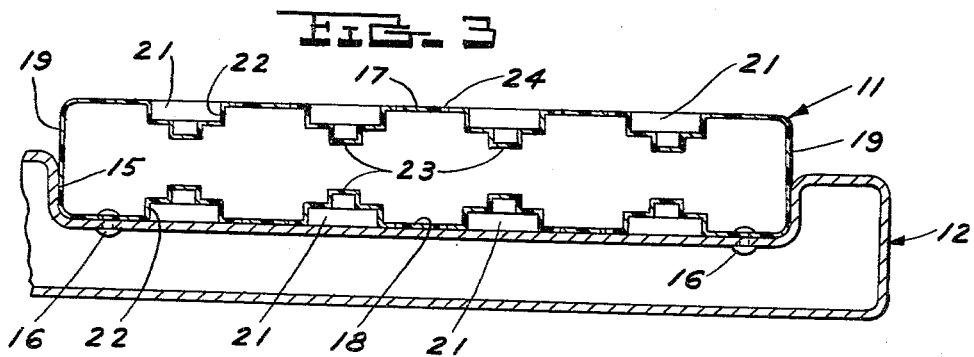
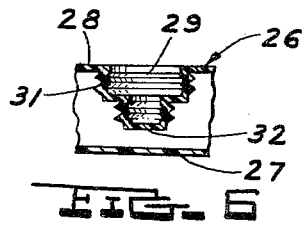
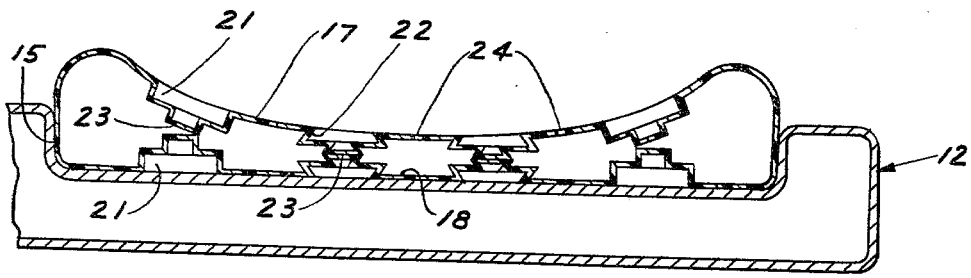
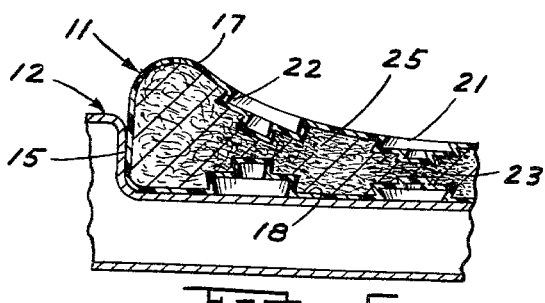
GORDON M. BUEHRIG
INVENTOR.
BY John R. Faulkner
Jerry J. Beck
ATTORNEYS

United States Patent Office 3,171,691
Patented Mar. 2, 1965

3,171,691
SEAT CONSTRUCTION
Gordon M. Buehrig, Dearborn, Mich., assignor to Ford Motor Company, Dearborn, Mich., a corporation of Delaware
Filed July 17, 1963, Ser. No. 295,725
5 Claims. (Cl. 297—455)

This invention relates to seat cushions and more particularly to seat cushions in which the resistance to deflection under load increases as the load is increased.

The design specification for a seat cushion represents a compromise of a variety of factors. Of importance are such factors as those relating to the design and application of the seat structure accommodating the seat cushion and the range of weights of persons to be supported by the cushion.

The present invention pertains to seat cushions particularly adapted for use with a low-cost molded bucket seat structure having rather shallow recesses to accommodate such cushions. Such a cushion has to be comfortable to sit on for relatively long periods of time, has to have a substantially low profile to blend aesthetically with the bucket seat design, and must be durable and low in cost.

Accordingly, it is an object of this invention to provide a seat cushion that is particularly adapted for use with low-cost molded seating structures or the like and which will meet the other enumerated requirements.

The seat cushion embodying the present invention comprises spaced upper and lower layers of material. The upper and lower layers may be spaced by air inflation or a readily compressible filler material. At least one of the layers, preferably the upper layer, is formed of a deflectable material provided with a plurality of inwardly extending pockets. These pockets are formed with wall portions that are constructed and arranged to compress with an increasing resistance when the cushion is deflected under load.

It is a further object of this invention to provide a relatively inexpensive and thin cushion that is also designed to furnish an increasing spring resistance when it is deflected under load.

Other objects and features of the present invention will become more apparent as this description proceeds, particularly when considered in connection with the accompanying drawings, in which:

FIGURE 1 is a perspective view of the novel seat cushions of this invention incorporated in a seat structure;
FIGURE 2 is a sectional view taken along line 2—2 of FIGURE 1;
FIGURE 3 is a vertical section taken through a deflectable cushion embodying the present invention depicting the cushion when not under load;
FIGURE 4 is a vertical sectional view of the cushion shown in FIGURE 3 but with the cushion shown in a deflected condition;
FIGURE 5 is a fragmentary sectional view of a cushion of an alternate embodiment of this invention with the cushion shown in a deflected condition; and
FIGURE 6 is a fragmentary sectional view of a cushion of a further embodiment of this invention with the cushion shown in a nondeflected condition.

Referring now to the drawings, especially to FIGURES 1 and 2, seat cushions generally designated 11 embodying the present invention are shown mounted on a unitary seat structure frame 12 comprising vertically disposed seat back portions 13 and a horizontally disposed seat portion 14 integrally formed therewith. The seat structure frame 12, which may be molded from a suitable thermosetting material or stamped from sheet metal has a generally box-shaped cross section to provide rigidity.

The seat portion 14 and the seat back portions 13 are provided with generally rectangular-shaped shallow recesses 15 extending inwardly from the seating surface of the seat portion 14 and from the back rest surface of the seat back portion 13, respectively. Each recess 15 receives the deflectable cushion 11 of this invention. The cushion 11 may be attached to the seat structure frame 13 by a fastening means such as rivets 16 if desired to maintain it in position in the recess 15 of the seat back portion 13.

The cushion 11 of the first embodiment of this invention is best seen in FIGURES 3 and 4. The cushion 11 comprises an upper layer 17 and a lower layer 18 manufactured from an impervious, flexible material such as a relatively heavy gauge vinylidene chloride or similar synthetic fabric. The perimeter of the upper layer 17 is maintained in a vertically spaced relationship to the perimeter of the lower layer 18 by side panels 19.

The upper layer 17 and the lower layer 18 are formed with inwardly extending pockets 21 each of which has cylindrical-shaped concentrically stepped wall portions 22 that are closed at the bottom thereof by a base portion 23. Respective pairs of the upper and lower pockets 21 are preferably axially aligned with their base portions 23 spaced from each other when the cushion 11 is in a non-load bearing condition. The stepped wall portions 22 are constructed to collapse with an increasing spring resistance when a vertical load is applied thereto. As an occupant seats himself on the cushion 11, the upper layer 17 will be deflected inwardly to effect the abutment of the base portions 23 of the axially aligned pockets 21 as seen in FIGURE 4. Then the wall portions 22 will gradually collapse telescopically inwardly to provide an increasing spring rate for the cushion as the load is increased thereupon.

In this illustration, the cushion 11 contains only air between the upper layer 17 and the lower layer 18. The air is exhausted through a plurality of small openings 24 provided in the layers as the cushion 11 is deflected under load. When the load is removed from the cushion 11, air is pulled in through these openings 24 to restore the cushion 11 to its normal shape.

It is also to be understood that the cushion 11 may be provided with pockets 21 in either the upper layer 17 or the lower layer 18 only, in which case the base portions 23 of the pockets 21 extending inwardly from one of the layers will abut the inside surface of the other of the layers when the cushion 11 is deflected under load.

The cushion 11 may also be filled with a cellular, resilient, core material 25 as seen in FIGURE 5. As the core material 25 is compressed under load, the base portions 23 of the pockets 21 extending inwardly from both layers 17 and 18 or from either one of the layers only will engage the compressed core material 25 when the cushion 11 is deflected.

In FIGURE 6 is seen a cushion of a second embodiment of this invention generally designated 26. The cushion 26 comprises a lower layer 27 and an upper layer 28 formed with inwardly extending pockets 29 having bellows-shaped wall portions 31, the wall portions of each pocket 29 being closed at the bottom thereof by a base portion 32.

The bellows-shaped wall portions 31 are constructed so as to function in a similar fashion as the wall portions 22 of the cushion 11 of the first embodiment of this invention.

When a vertical load is applied to the cushion 26, the bellows-shaped wall portions 31 will collapse with an increasing spring rate after the base portions 32 of the pockets 29 are in abutment with either the lower layer 27 or any suitable compressible core material that may be disposed intermediate the upper layer 28 and lower layer 27. The bellows-shaped construction of the wall portions 31 of this embodiment provide a spring rate which is greater than the spring rate of the wall portions 22 of the pockets 21 of the first embodiment heretofore discussed. Thus, the cushion 26 is more suitable for heavy-duty applications.

The pockets of the various cushions of this invention may be molded integrally with the upper and/or lower layers which are formed from a material having the desired resilient characteristics. In the alternative, the pockets may be molded separately from an impervious material possessing a greater amount of resiliency than either the upper layer or lower layer material and then attached by a dielectric or other bonding process to the inside surfaces of the layers directly.

The seat structure frame 12 embodying a cushion of either the first embodiment or the second embodiment of this invention is relatively inexpensive to manufacture and has an aesthetic appearance. It may be readily installed in motor vehicles to provide an inexpensive bucket seat option.

It will be understood that other various changes and modifications may be made without departing from the spirit and scope of the invention as defined in the appended claims.

I claim:

1. A seat cushion comprising a base layer and an upper layer formed from an impervious, deflectable material, said upper layer and said lower layer being in a spaced relationship to each other, at least one of said layers being formed with a plurality of inwardly extending pockets having bellows-shaped side wall portions and base portions extending in substantially parallel relationship to said one layer, said wall portions being collapsible with an increasing resistance when one of said layers is deflected under load to bring said base portions into an abutting relationship with the other of said layers.

2. A seat cushion comprising a base layer and an upper layer formed from an impervious, resilient material, said base layer and said upper layer being in a spaced relationship to each other, and a cushioning layer interposed between said upper layer and said base layer, at least one of said layers being formed with a plurality of inwardly extending pockets having concentrically stepped wall portions and base portions extending in a substantially parallel relationship to said one layer, said wall portions being compressible with an increasing resistance when one of said layers is deflected under load to bring said base portions into an abutting relationship with said cushioning layer.

3. A seat cushion comprising a base layer and an upper layer formed from an impervious, resilient material, said upper layer and said base layer being in a spaced relationship to each other by side walls, said base layer and said upper layer having a plurality of pockets therein extending inwardly thereof in aligned pairs, each of said pockets having diametrically decreasing concentrically stepped wall portions and being closed at the bottom thereof by a base portion, the base portions of said aligned pairs of pockets being spaced from each other when said seat cushion is in a nondeflected condition, said stepped wall portions of said pockets being compressible with an increasing spring resistance when said cushion is deflected under load to bring said base portions into abutting relationship with each other.

4. A seat structure comprising a unitary frame including an intergally formed seat portion and a seat back portion, a recess in said seat portion and said seat back portion, a cushion mounted in each of said recesses, said seat cushion comprising a base layer and an upper layer formed from an impervious, resilient material, said base layer and said upper layer being in a spaced relationship to each other, at least one of said layers being intergally formed with a plurality of inwardly extending pockets, said pockets having concentrically stepped wall portions and base portions extending in a substantially parallel relationship to said one layer, said wall portions being compressible with an increasing spring resistance when one of said layers is deflected upon said seat structure being occupied to bring said base portions into an abutting relationship with the other of said layers.

5. A seat structure comprising a frame integrally formed with a seat portion and a seat back portion, a recess integrally molded in each of said seat and seat back portions, a deflectable cushion received in each recess, said seat cushion comprising an inner core of resilient, cellular material and an outer covering of an impervious, resilient material, said outer covering having a plurality of pockets therein extending inwardly from opposite sides thereof in aligned pairs, said pockets having wall portions and being closed at the bottom thereof by base portions, said base portions of said aligned pairs of pockets being separated by said cellular material, the wall portions of said pockets being compressible with an increasing resistance when said cushion is deflected upon said seat structure being occupied to bring said base portions into an abutting relationship with said inner core.

References Cited in the file of this patent

UNITED STATES PATENTS

| | | |
|---|---|---|
| 2,272,290 | Beal | Feb. 10, 1942 |
| 2,350,711 | Amos | June 6, 1944 |
| 2,434,641 | Burns | Jan. 20, 1948 |
| 2,488,993 | Teague | Nov. 22, 1949 |
| 2,659,418 | Berman | Nov. 17, 1953 |
| 2,821,244 | Beck | Jan. 28, 1958 |
| 2,901,028 | Bottemiller | Aug. 25, 1959 |
| 2,976,916 | Schladermundt et al. | Mar. 28, 1961 |